United States Patent [19]

Daniels

[11] 3,949,635

[45] Apr. 13, 1976

[54] PUNCHING, CONTOURING, HANDLING APPARATUSES AND METHOD

[75] Inventor: Dennis Daniels, Bellevue, Wash.

[73] Assignee: U.S. Amada, Ltd., City of Industry, Calif.

[22] Filed: Aug. 6, 1973

[21] Appl. No.: 386,064

Related U.S. Application Data

[63] Continuation-in-part of Ser. No. 359,983, May 14, 1973.

[52] U.S. Cl. .................... 83/405; 83/552; 214/1 BC
[51] Int. Cl.² .......................................... B26B 9/00
[58] Field of Search ............. 83/154, 267, 404, 405, 83/406, 409, 552; 408/89, 91; 214/1 BC

[56] References Cited
UNITED STATES PATENTS

| | | | |
|---|---|---|---|
| 3,293,971 | 12/1966 | Kuss...................................... | 83/412 |
| 3,603,191 | 9/1971 | Muller et al. ......................... | 83/405 |
| 3,623,385 | 11/1971 | Schneider et al. ................. | 83/267 X |
| 3,718,216 | 2/1973 | Wilson.............................. | 214/1 BC |

*Primary Examiner*—Willie G. Abercrombie
*Assistant Examiner*—Z. R. Bilinsky
*Attorney, Agent, or Firm*—Seed, Berry, Vernon & Baynham

[57] ABSTRACT

A rotary turret numerically controlled punch press is provided with a discharge station at 90° from a punching station. A part is clamped in the turret, separated from a larger workpiece and then rotated with the turret to the discharge station. A transfer arm is slaved to the NC punch press and engages the part at an exact attitude and position relative to a reference point on the part and transfers the part to a rotary chuck. The part is placed in the chuck at an exact attitude and with the reference point at the axis of rotation of the chuck.

Four rotary chucks are provided on a rotary turret contouring apparatus. The turret is rotated 90° to position the part at a cutting station.

A band saw is provided with rotary guides for changing the angle of the saw. While the part is rotated and linearly translated toward and away from the saw by the contouring apparatus, the saw cuts a peripheral shape on the part with the blade changing its angular attitude where necessary. An air cushion support holds the edge of the part at the saw blade.

After cutting, the contouring turret is rotated another 90° bringing the part to a deburring station. The motion of the part at the deburring and cutting stations is identical for simultaneous cutting and deburring. Next the turret is rotated another 90° and the deburred part is engaged by a second transfer arm to remove the part and locate it for subsequent treatment.

7 Claims, 31 Drawing Figures

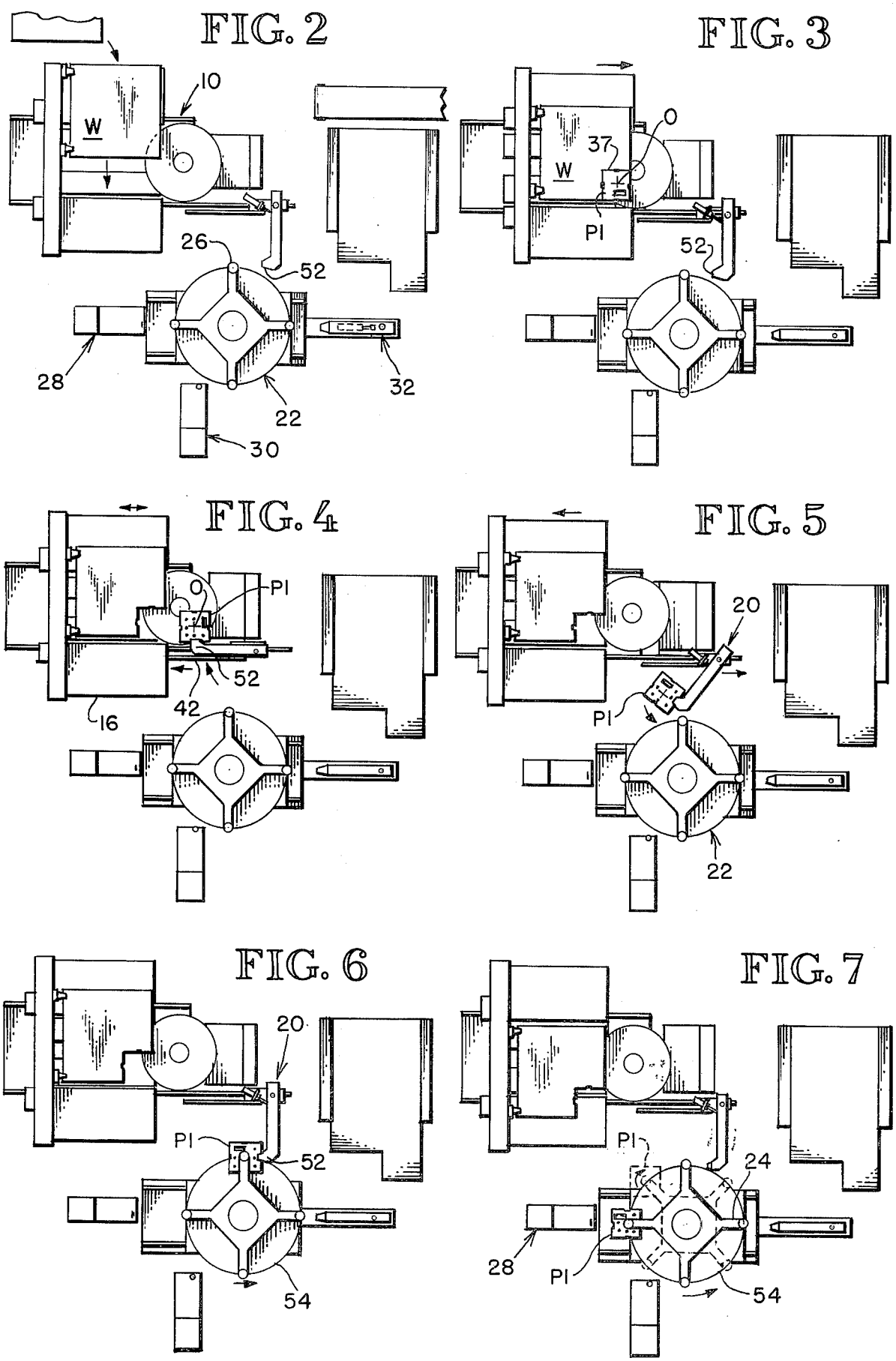

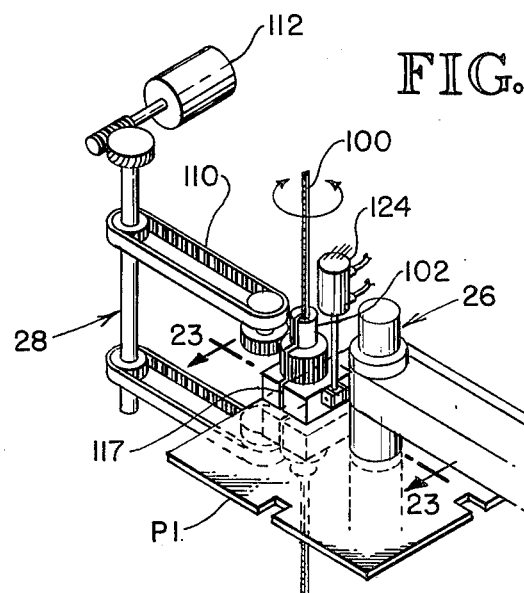
FIG. 22
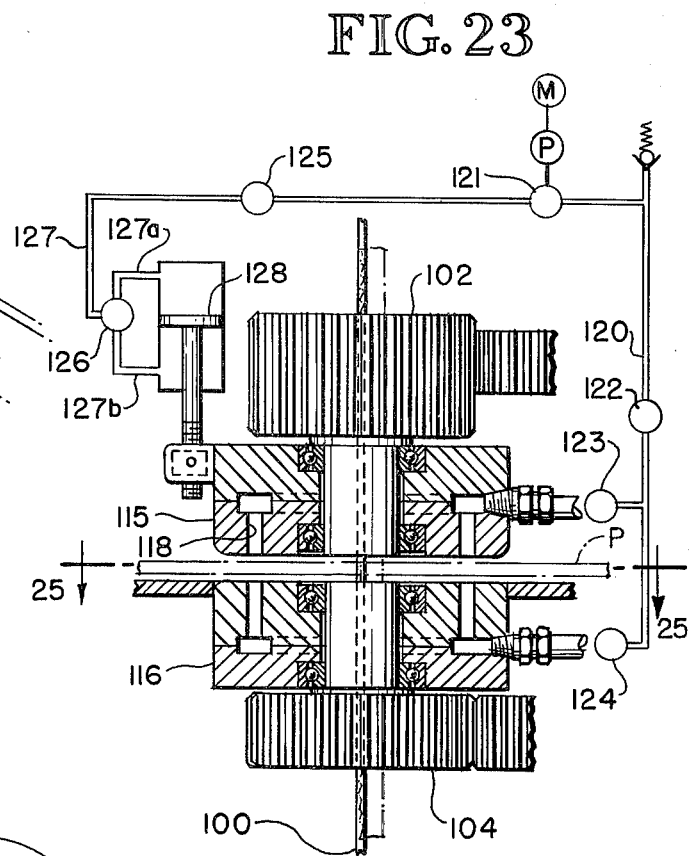
FIG. 23
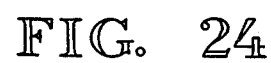
FIG. 24
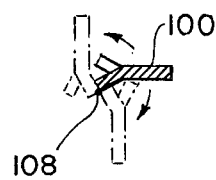
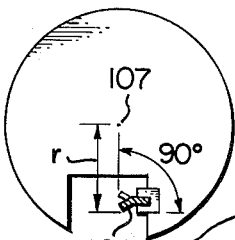
FIG. 24A
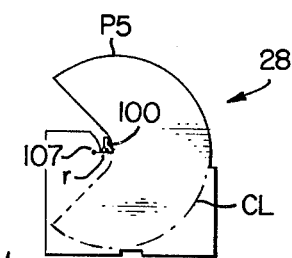
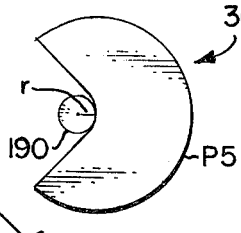
FIG. 25A
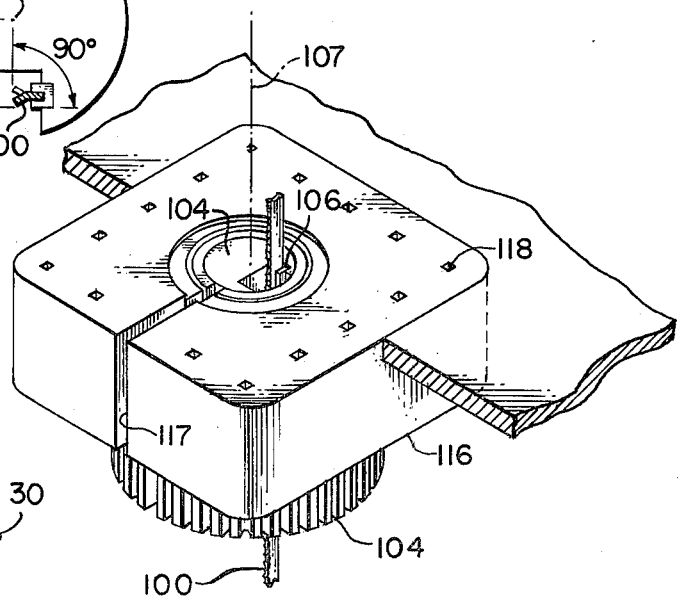
FIG. 25

3,949,635

PUNCHING, CONTOURING, HANDLING APPARATUSES AND METHOD

CROSS-REFERENCE TO RELATED APPLICATIONS

This is a continuation-in-part of my earlier U.S. Pat. application, Ser. No. 359,983, filed May 14, 1973.

BACKGROUND OF THE INVENTION

1. Field of the Invention

This invention pertains to sheet material handling and fabricating methods and systems and components of such systems. The sheet material is of the self shape-sustaining type such as plastic, wood or metal.

2. Description of the Prior Art

In many industries particularly the aerospace industry, there is a need for the mechanized production of a relatively few irregularly shaped sheet material parts. For example, only two and three hundred such parts may be needed in a year. Presently these parts are made by first cutting a templet and than either by hand or with limited machinery cutting the shape of the templet in the sheet material. After the part is cut, a considerable amount of manual deburring of the cut edge is required with still more surface finishing following. The cost of such individual parts is quite high and since a particular industry may need as many as two or three thousand different shaped parts manufactured in this way, the ultimate cost is considerable.

There is therefore a need in the sheet material handling and fabricating industry for an apparatus or method to mechanize the production of a large variety of relatively few parts of sheet material. While the numerically controlled punch press is a useful tool for satisfactorily fabricating holes or the like internally in the part it is not satisfactory for cutting the peripheral shape of such irregularly shaped parts, and thus cannot fully satisfy the need for full mechanization.

SUMMARY OF THE INVENTION

It is an object of this invention to provide method and apparatus for punching and contouring irregularly shaped sheet material parts.

It is another object to provide an apparatus for separating a part from a larger workpiece in a numerically controlled turret punch press.

It is another object of this invention to provide an apparatus for transferring a part from a punch press to a second machine while maintaining a high degree of accuracy in the location and angular attitude of the part in the second machine.

It is another object of this invention to provide a contouring apparatus for cutting a peripheral shape on a part.

It is another object of the invention to provide apparatus for rotating and linearly translating sheet material.

It is another object of this invention to provide a multi-station contouring apparatus which simultaneously and automatically cuts a peripheral contour on a part and deburs the cut periphery of the part.

It is another object of this invention to provide a cutting and sheet handling device which can change blade attitude, rotate the part and linearly translate the part to cut the peripheral shape of the part.

It is another object of this invention to provide an air cushion support for the outer edge of a sheet material part around a cutter.

These objects are obtained in several inventive features of separate inventions. The first inventive feature is an automated punching and contouring method and apparatus in which a part is first removed from a larger worksheet while in a numerically controlled turret punch press, next the part is transferred accurately to a contouring apparatus, next the part is cut along a peripheral shape in the part, next the cut edge of the peripheral shape is deburred and finally the cut and deburred part is transferred to a subsequent fabricating operation.

The preferred form of the contouring apparatus is embodied in a four arm rotary turret and is in effect a multi-station sheet material contouring lathe. Each arm of the turret is provided with a rotary chuck which can clamp the part and rotate the part independently of the turret. The turret is intermittently rotated in 90° increments to position the part at various fabricating stations. While at these stations, the turret can also be linearly translated so that the combined linear translation and the rotary motion of the chuck will enable the part to be simultaneously manipulated relative to a cutting or deburring tool at different stations.

The rotary turret of the contouring apparatus is also advantageously driven in conjunction with the chucks to maintain the exact orientation of the part in each of the various stations. That is, although the chucks can be rotated independently to re-establish a desired orientation of the part at each station, preferably the chucks are temporarily interconnected with the drive for rotating the turret to assure precise orientation automatically.

The term automatic used throughout this application means not only programmed control wherein the program is recorded either on cards, tapes or in a larger general or special purpose computer, but the term also means manual remote control in which an operator is manually actuating the controls from a remote console. The invention is best utilized in the fully computerized automatic mode however.

The inventive part separation feature of the invention employed in the preferred embodiment includes a separate station on the rotary turret of the punch press. Special tooling severs the last remaining connection between the part and the large workpiece while clamping the workpiece. The part is then rotated 90° by the turret to a discharge station.

A third inventive feature includes a transfer mechanism that through predetermined accurate arcuate and linear motions engages the part at some predetermined location and attitude and positions the part into a subsequent apparatus such as in the preferred embodiment, the contouring apparatus of this application. It is understood however that the accurate attitude and location control offered by the transfer mechanism makes the mechanism a useful addition to a turret type punch press also for other handling operations.

The transfer mechanism of the preferred embodiment includes an arm pivotally mounted on a slider. The slider is provided with gauging means which can be brought into abutment with a gauging surface on the numerically controlled workpiece positioning portion of the punch press. In this manner, the position of a part engaging clamp on the arm both as to attitude and location is mechanically slaved to the punch press relative to a reference point on the part. The part engaging clamp can be positioned along the arm, however, by an independent servo motor if desired. The part then is swung by the transfer arm and in the preferred embodiment, the contouring apparatus is positioned to receive the part in a correct angular attitude and with the reference point located exactly in the center of a rotary chuck on the contouring apparatus.

Still another feature of the invention includes a rotary chuck that can linearly translate and rotate a part relative to a cutting tool. In the preferred embodiment, the cutting tool is a planar member such as a band saw blade and a further inventive feature is the unique combination of simultaneous angular attitude control of the blade combined with the rotation and linear translation of the part. It should be understood however, that other cutting tools such as slicers, lasers, routers etc., can be used in conjunction with the rotary chuck capability of simultaneous linear translation and rotation.

Another inventive feature is the provision of apparatus to support the part at the cutting station in close proximity to the cutting blade or other surface cutting or finishing tool by an air cushion which allows free frictionless translation of the part for positioning it relative to the blade and also dampens vibrations of the part during the cutting operation. In the preferred embodiment, the air cushion is provided below and above the part with an additional pneumatic mechansim for lowering and retracting the upper half of the air cushion device to allow insertion of the part and provide control of the air acting on the part.

BRIEF DESCRIPTION OF THE FIGURES OF THE DRAWING

FIG. 2–14 are schematic, plan, operational views illustrating a sequence of operation of the apparatus shown in FIG. 1.

FIG. 22 is a schematic isometric of a portion of the cutting apparatus shown in the apparatus of FIG. 1.

FIG. 23 is a vertical section taken along the arrows 23—23 of FIG. 22.

FIG. 24 is a schematic horizontal section taken through the blade of the cutting tool shown in FIG. 26.

FIG. 24A is a schematic horizontal section taken through the blade shown in FIG. 22.

FIG. 25 is a fragmentary isometric of a portion of the blade guiding and air cushion supporting apparatus shown in FIG. 23.

FIG. 25A is a schematic operational view illustrating an offset cutting blade pivot arrangement used with a cylindrical deburring tool.

DETAILED DESCRIPTION OF THE PREFERRED EMBODIMENTS

General Description

Figure 1:
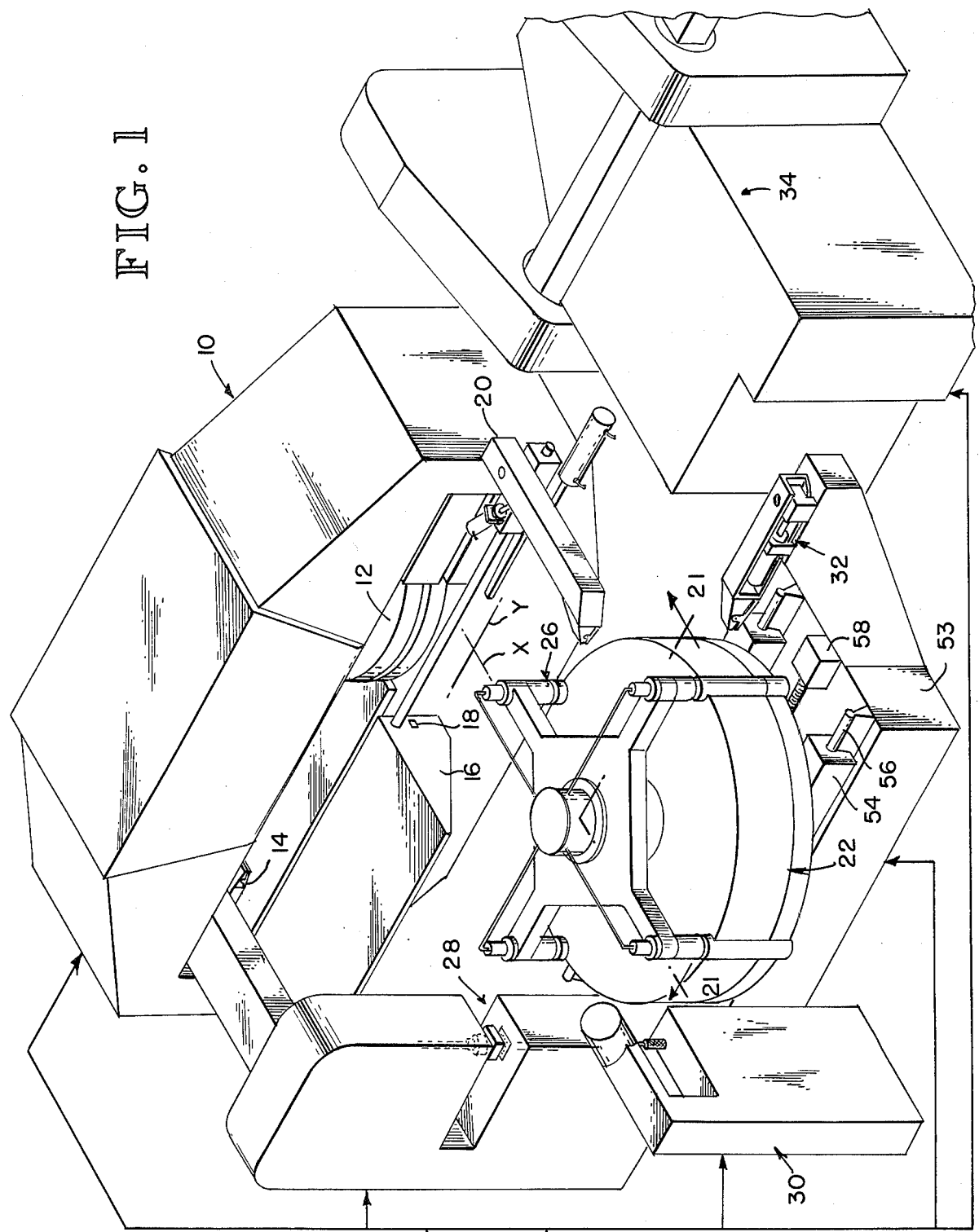
FIG. 1 is an isometric of a punching and contouring apparatus embodying the principles of the invention.

As best illustrated in FIG. 1, the preferred punching and contouring apparatus employing various inventive features includes a rotary turret type, numerically controlled punch press 10 preferrably of the type illustrated in U.S. Pat. No. 3,717,061, the description of which is incorporated herein by reference thereto. Alternatively, conventional punch presses of the type having a rotary turret for holding a multiplicity of tools can also be adapted by those skilled in the art to embody the principles of the invention. The punch press 10 includes a multiple tool turret 12 having a plurality of standard tools and a special tool and clamping mechanism as will be described herein below. In addition, the punch press is provided with workpiece positioning means 14 that locates by numerical or other suitable control a worksheet W beneath a punching station at the turret. In the preferred form of punchpress illustrated, the workpiece positioning means 14 includes a side table 16 that moves with the worksheet along the Y axis of the punch press. As will be described in more detail below, the side table is provided with a gauging block 18 that can be accurately located along the Y axis by the side table and serves to position a transfer mechanism 20.

The transfer mechanism 20 is basically a pivotal arm type such as generally illustrated in my earlier U.S. Pat. application, Ser. No. 311,885, filed Dec. 4, 1972 and entitled Fabricating Apparatus Interface Mechanism and System, the details of which are incorporated by reference thereto. The transfer mechanism is adapted to move along the Y axis and swing a part P between the punch press and the contouring apparatus to position the part very accurately in the contouring apparatus.

The contouring apparatus 22 is located adjacent to the punch press 10 and includes, in general, a rotary turret 24 movable between four stations. The turret includes four arms each carrying a rotary chuck 26. The turret moves the rotary chuck first to a cutting apparatus 28, thence to a deburring apparatus 30, and finally to a discharge station where the part is removed from the chuck by a second transfer mechanism 32 which can then deliver the part to a subsequent fabricating apparatus such as a surface finishing machine or a folding machine 34. A suitable folding machine is illustrated in my earlier U.S. Pat. application, Ser. No. '186,062, filed Oct. 4, 1971, entitled NC Automatic Folding Machine, the details of which are hereby incorporated by reference thereto.

PART SEPARATION FROM WORKSHEET

Figure 15:
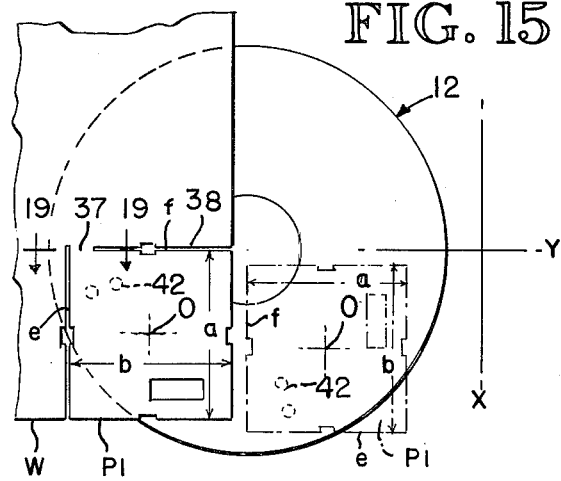
FIG. 15 is a fragmentary horizontal section of a portion of the punch press shown in FIG. 1 illustrating the separation of a part from a larger workpiece.
Figure 19:
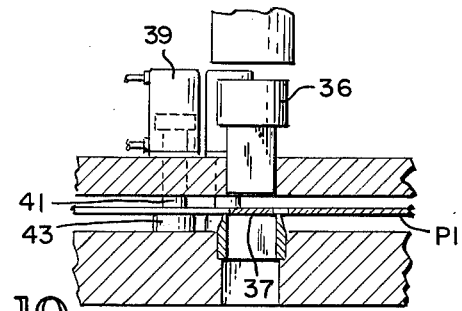
FIG. 19 is a fragmentary vertical section taken along the line 19—19 of FIG. 15.

It is an important inventive feature that a multiple number of parts can be removed from a larger worksheet while the worksheet remains in the punch press. For this purpose and as best shown in FIGS. 15 and 19, the turret 12 is provided with a special tooling which includes a conventional thin-section punch and die 36 suitable for cutting through the remaining piece of material 37 connecting the part P-1 with worksheet W after the part has been completely nibbled substantially free of the worksheet as along lines 38. The internal notches, openings, etc. necessary in the part P-1 are made using conventional punch press procedures. Next, the edge 38 is nibbled on all of the sides connected to the worksheet W leaving the one connected portion 37 remaining. The turret 12 is then rotated until the tool 36 is positioned beneath the striker of the punch press.

On the turret 12 adjacent the special tool 36 are two or more (two illustrated) clamps. Each clamp includes a pneumatically operated piston rod 42 which can be thrust downwardly against the part holding it against a block 43. With the two clamps engaging the part, the punch 36 can then be actuated severing the last remaining connection with the worksheet. While still clamped, the part is then rotated 90° to the side of the punch press while the worksheet is withdrawn by the worksheet positioning means 14. At this time, the part separation is complete with the part P-1 being in a position laterally to the side of the punch press whereupon raising clamp piston rods 42, it is easily accessible for removal. After removal, the next part P-2 (FIG. 8) can be punched and the separation procedure repeated.

SLAVE TRANSFER MECHANISM

As is readily understood, the size of the parts P may vary for each different worksheet W and if desired may even vary within a single worksheet. As a result, it is necessary that the part P be positioned in the punch press 10, transfer mechanism 20 and ultimately in the contouring chuck 26 in a predetermined and accurate manner so that programmed controls can be utilized. Since the final separation of the part from the worksheet always occurs at the same corner, the upper left hand corner as shown in FIG. 15, edge $e$ of the part will always be at the same distance from the outside of the turret 12 regardless of the size of the part. This allows the transfer mechanism to engage the part always at a known location along the X axis of the punch press. The dimension $a$ of the part, however, may vary. This variance as will be seen is uniquely provided for by slaving the transfer mechanism to the NC controls of the punch press. Furthermore, in positioning the transfer mechanism relative to the part, it is also important to engage the part with reference to some predetermined reference point 0 which as will be described, becomes the center of rotation of the part in the contouring apparatus 26. Preferably, although not necessarily, the reference point 0 is at the approximate geometrical center of the part.

Figure 16:
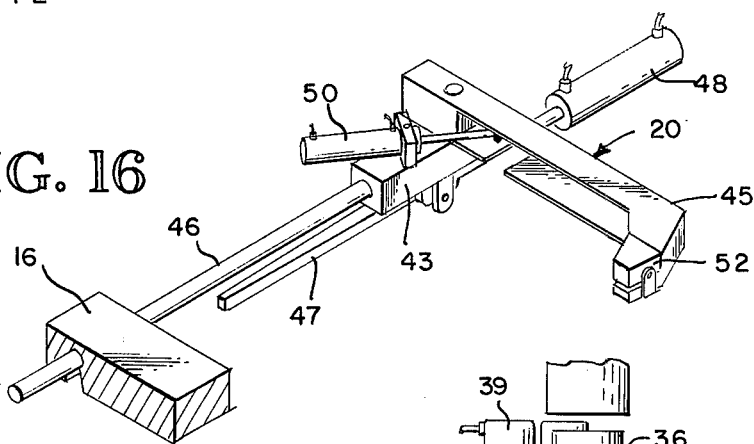
FIG. 16 is a fragmentary isometric of a transfer mechanism used in the apparatus in FIG. 1.
Figure 17:
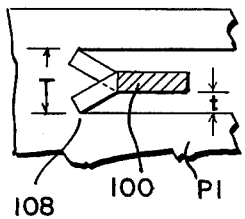
FIG. 17 is a schematic horizontal section of a band saw blade used in the apparatus in FIG. 1.

As best shown in FIGS. 1 and 16, the transfer mechanism 20 includes a transfer arm 45 pivotally mounted on a slider 43. The slider is slidably mounted on a rail 46 which forms a part of the punch press 10. The movable side table 16 of the punch press also slides on the rail 46 as more fully described in U.S. Pat. No. 3,717,061. The slider 43 is provided with a gauge bar 47 which abuts against the gauge block 18 on the movable side table. A pneumatic ram 48 slides the slider between a fully retracted position, as shown in FIG. 16, and a fully extended position as limited by the position of the gauge block 18. The arm is swung about its pivot by a second pneumatic ram 50 between two positions at a 90° angle with each other, that is, either fully parallel or fully perpendicular to the X axis of the punch press 10. Suitable details of construction for the transfer mechanism 20 can be obtained from said application, Ser. No. 311,885 including a suitable part clamp 52 for releasably holding the part.

In operation, the input of the computer or other control for the punching and contouring apparatus will receive the information as to the dimensions of the outer periphery of the part, namely dimensions $a$ and $b$ as shown in FIG. 15 and the locating data for reference point 0. After the part has been rotated 90° to its discharge position, the dimension $a$ will be used to position the clamp 52 of the transfer mechanism. Although there are various techniques for moving the side table 16 and the slider 43, the preferred operation is to first return the side table 16 to the left to its home position along the Y axis of the machine. As the distance between the end of gauge bar 47 and the center of the clamp 52 is known, the exact position of the clamp 52 along the Y axis when the gauge bar 47 is abutting the block 18 is also known. It is thus a simple calculation to determine the distance that the side table must move from its home position in the Y axis to position the center of the clamp 52 at the reference point 0 along the dimension $a$ of the part P-1. Thus if the dimension $a$ is 15 inches and the reference point 0 is 7½ inches in from the left hand edge of the part P-1, along dimension $a$ the side table will advance along the Y axis 7½ inches, assuming the center of clamp 52 is aligned with edge $f$ of the part when the side table is in the home position, to position the center of the clamp 52 along the imaginary line passing through the reference point 0.

As is also apparent best from FIG. 2 of the drawing the center of the clamp 52, when arm 45 is swung away from the punch press, is also along an imaginary line which passes through the center of the chuck 26 so that by merely swinging the part through a 90° arc, the reference point 0 is in perfect alignment with the center of the chuck 26. Then to position the reference point 0 centrally in the chuck along the dimension $b$ of the part, it is only necessary to move the chuck on the contouring apparatus toward or away from the transfer mechanism 20 the correct distance in a manner similar to the initial positioning of the part in the clamp 52. That is, input known dimension $b$ to the control for the punching and contouring apparatus will provide the necessary distance that the chuck 26 must be moved toward or away from the clamp 52 so that the chuck will center itself over the reference point 0 on the part P-1.

While the preferred embodiment employs a mechanical interconnection to slave the position of clamp 52 relative to the part along the Y axis, it should also be understood that rather than have the arm slide on guide 46, the clamp 52 could be mounted to slide arm 45 powered by a servo motor to accurately align the clamp by numerical control.

CONTOURING APPARATUS

Figure 21:
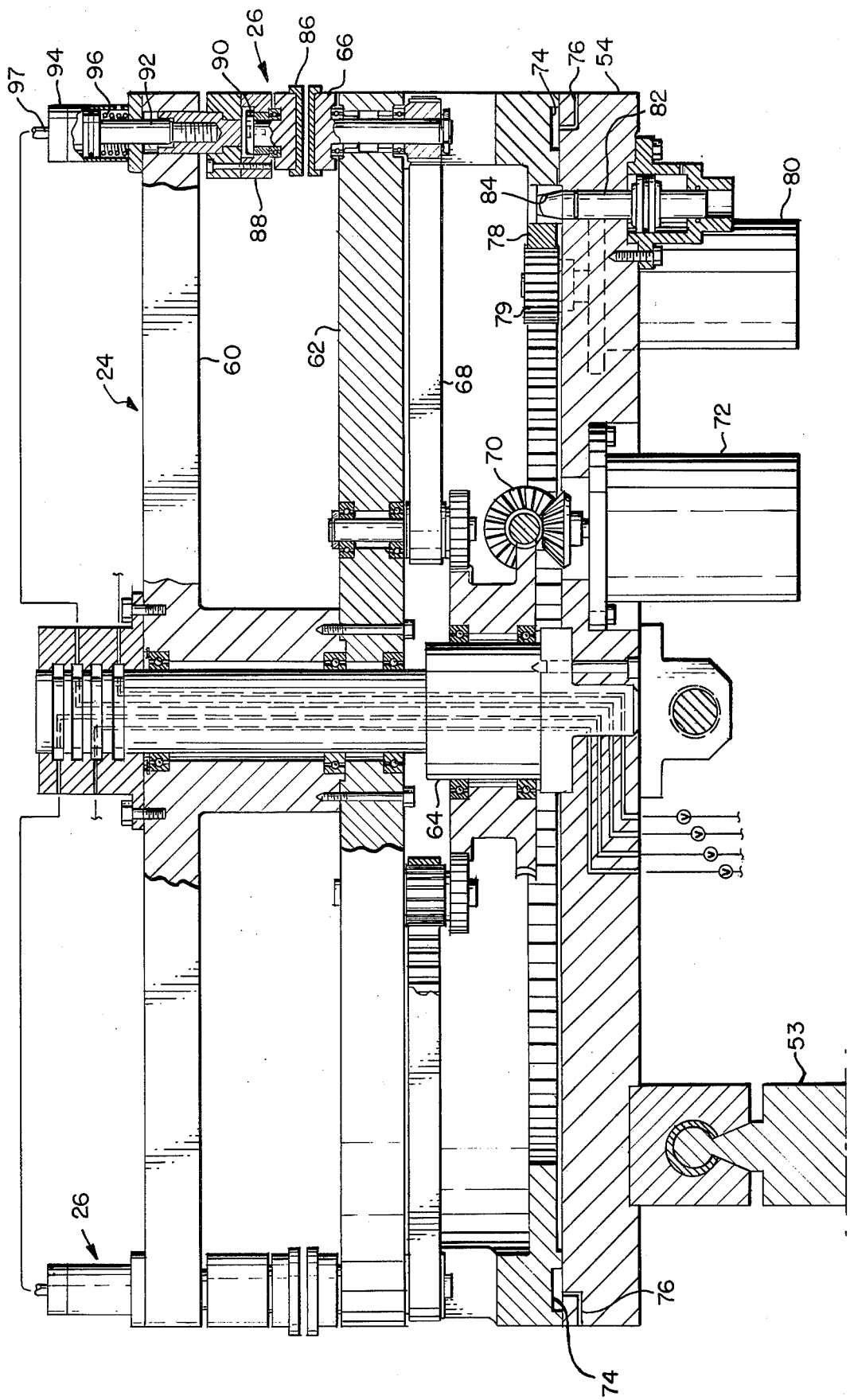
FIG. 21 is a vertical section axially through the contouring apparatus shown in FIG. 1.
Figure 26:
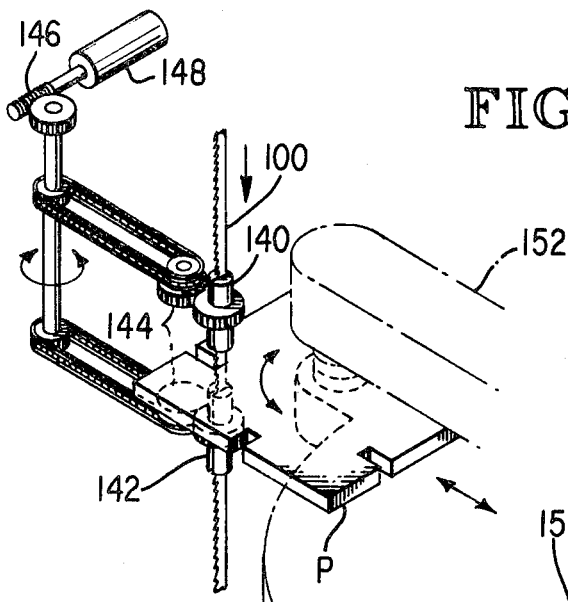
FIG. 26 is a schematic isometric of a modified form of cutting apparatus usable with the apparatus shown in FIG. 1.
Figure 27:
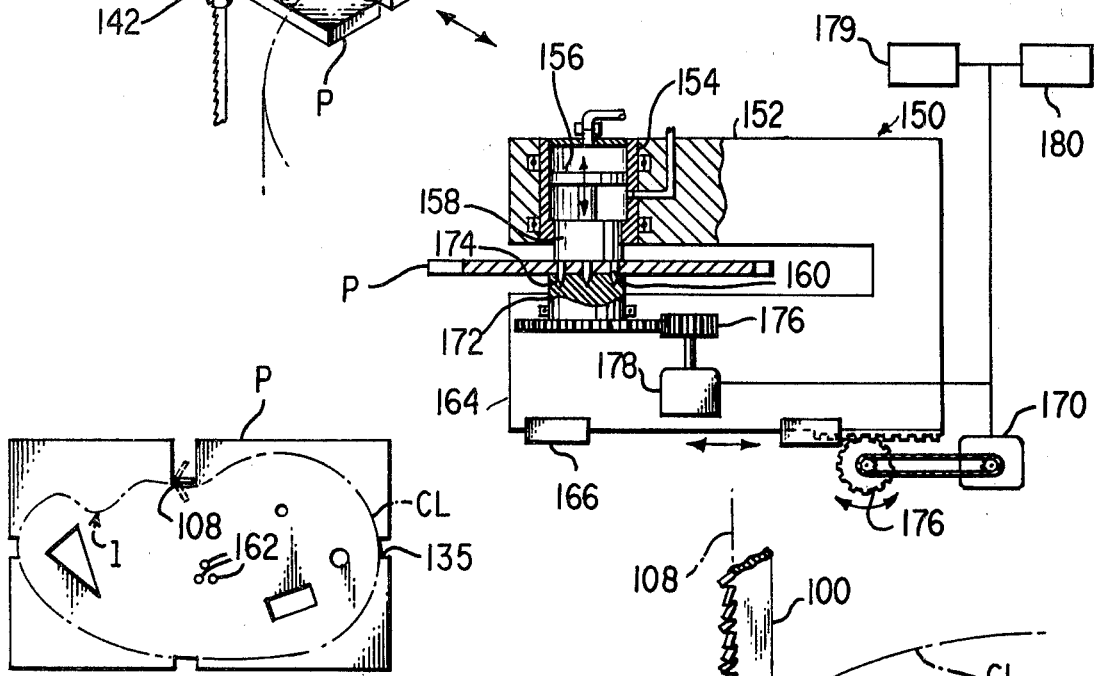
FIG. 27 is a schematic side elevation of a modified form of a contouring apparatus.
Figure 28:
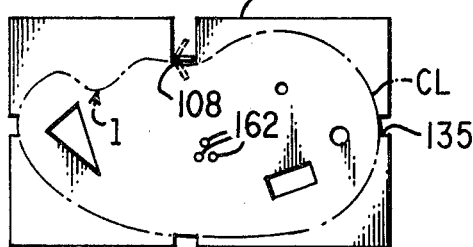
FIG. 28 is a second example of a typical part that can be made with the apparatus of the preferred embodiment or the modified embodiment shown in FIGS. 26 and 27.
Figure 29:
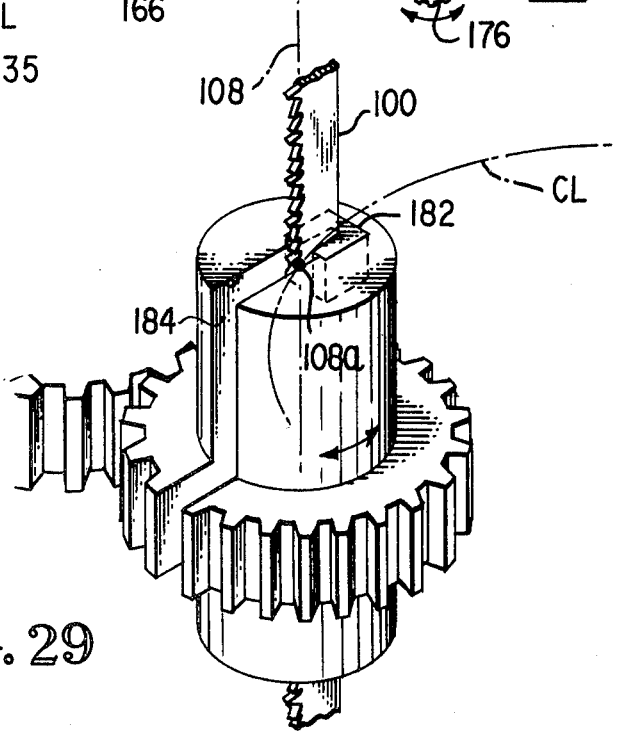
FIG. 29 is a fragmentary schematic of a portion of the apparatus shown in FIG. 26.

The contouring apparatus 22 is best shown in FIGS. 1, 2 and 21. The apparatus comprises a base 53 on which is mounted a movable carriage 54. The carriage 54 slides on rails 56 in a direction parallel to the Y axis of the punch press. It should be understood at this point that the movable direction of the carriage 54 need not be parallel to the Y axis of the punch press but rather can be any direction which avoids interference with operation of the punch press. The carriage is moved by a conventional worm drive powered by a motor 58. The turret 24 is rotatably mounted on the movable carriage 54 and includes a spider or set of upper arms 60 and a disk 62. The arms 60 and disk 62 are rotatably mounted on a fixed hollow shaft 64. Mounted in the disk 62 are four rotatable plates 66 which are connected by belt drives 68 and interconnected gearing 70 to a motor 72. Rotation of the output shaft of the motor 72 will rotate all four plates 66 simultaneously.

The disk 62 is supported on the movable carriage 54 by an air cushion chamber 74 using conventional techniques and which is pressurized through a port 76 in the movable carriage 54. The disk 62 is also provided with a circumferential ring gear 78 that is driven by a pinion 79 and a motor 80. Accurate positioning of the disk 62 relative to the carriage 54 is provided by a conventional pneumatically actuated shot pin 82 and conical aperture 84. When the shot pin 82 is retracted, the motor 80 can be driven to rotate the disk 62 and upper arms 60 in 90° increments about the shaft 64. By holding the motor 72 de-energized, the gear 70 will be locked, thus simultaneously causing the belts 68 to rotate thus rotating the plates 66 of each of the chucks 26. It is a unique feature of this invention that the gear ratio between the gearing 70 and the pinion and ring gear 79 and 78, respectively, is such that upon 90° rotation of the turret 24, the chucks 26 will have been rotated in the opposite direction to maintain the same orientation of the parts in the chucks in each of the stations. This identical orientation is best shown, for example, in FIGS. 6 and 7. It is, of course, apparent, that the turret can be rotated and later the chucks can independently be rotated to re-establish a desired orientation of the parts. The inter-connected gearing with proper gear ratio, however, does provide this orientation automatically and in a single mechanically interlocked manner.

The upper arms 60 each carry an upper portion of the chuck 26 which likewise is rotatable. Although various arrangements will be satisfactory, the preferred form provides a movable plate 86 rotatably mounted in a retainer block 88. A removable retainer clip 90 holds the movable member 86 in the retainer block 88. The retainer block 88 is movable vertically a sufficient distance to allow placement of a part between the two movable plates 86 and 66. To clamp the part between the plates, a piston rod 92 is threadibly secured to the retainer block 88 and is slidably positioned in the upper arm 60. The piston of the piston rod 92 is slidably held in a cylinder 94 and is spring biased upwardly by a spring 96. Air introduced through a line 97 will move the piston rod downwardly, thus clamping a part P between the movable plates 86 and 66. De-energization of the air pressure will allow the spring 96 to raise the movable plate 86 thus releasing the part. Air is brought in separately to each of the rotary chucks 26, since at some stations the part will remain clamped between the movable plates 86 and 66 while at the receiving and discharging stations of the rotary turret 24, the part may be inserted and released.

It is thus readily apparent that the contouring apparatus 22 provides a means for linearly translating a part while simultaneously rotating the part. Obviously, such mechanism has utility in various types of sheet metal or other sheet material fabricating machines. It is especially useful in a periphery cutting operation which will now be described.

BLADE ANGLE ATTITUDE

The basic principles of the cutting operation are described in my earlier filed patent application Ser. No. 359,983 of which this application is a continuation-in-part. Similarily, details of that description are incorporated herein by reference to the application. In the now preferred form of the cutting apparatus, a rotary band saw blade 100 is held in an upper guide 102 and a lower guide 104, FIG. 23. As best shown in FIG. 25, the guides each have a hard carbide guide insert 106 which is offset rearwardly of the center of rotation 107 of the guides 102 and 104 and is spaced along the diameter a distance $r$ from the axis of station such that the cutting edge of the blade moves about the axis of rotation at the same distance as the cutting surface of the deburring tool 190 moves about its axis of rotation (FIG. 24A). Two sets of timing belt drive gears 110 are driven by a servo motor 112 to simultaneously rotate the upper and lower guides 102 and 104. Rotation may be obtained in this manner from a central blade position shown in FIG. 24 in solid lines to either of two 90° positions on either side of the central blade position. If desired, further rotation may be provided being limited only by the structural capability of the blade 100. As an alternative, of course, the entire band saw machine 28 can be rotated about the axis 107.

The purpose of the offset position of the cutting blade being correlated to the radius of the deburring tool 190 is best explained with reference to FIG. 25A in which two parts are shown as they would be simultaneously moved at the cutting and deburring stations 28 and 30. As readily apparent the cylindrical deburring tool 190 has a deburring surface which is spaced a distance $r$ from the axis of rotation of the tool 190. Thus if the part P5 has a radius to be cut equal to the radius $r$ of the deburring tool, the part P5 must be halted. The cutting blade 100 however, must still traverse the radius of the part. This is accomplished while the part is held stationary by merely rotating the blade by numerical control about the axis 107. Since the distance $r$ is the same for the blade and the deburring tool, rotation of the blade will follow the desired radius of the part. When the radius has been cut, simultaneous movement of the part at the deburring and cutting stations will continue.

As an alternative the deburring tool can be a second fine toothed band saw blade having a point contact with the part identical to that of the cutting blade 100. In such case the axis of rotation of both blades can be exactly at the cutting edge of each blade in a manner illustrated in more detail with reference to FIGS. 24, 26 –29.

AIR CUSHION EDGE SUPPORT

It is desirable when working with most thicknesses of sheet material to support the part immediately in the vicinity of the cutting blade. It is also desirable to allow, however, free planar movement of the part to incorporate the peripheral contouring principles of this invention. For this purpose, a fixed upper air cushion pad 115 and an identical fixed lower pad 116 are provided respectively on the guides 102 and 104. The guides 102 and 104 are rotatably mounted within the pads. The guides, gears and pads are provided with an aligned slot 117 to allow removal of the blade. Each of the pads is provided with air cushioning ports 118 in a well known manner which are distributed throughout the surfaces of the pads exposed to the part P. An air line 120 distributes air from a pump, motor and tank 121 to the ports 118. Adjustable pressure restriction valves 123 and 124 regulate the air pressure to the pads. A shut-off valve 122 controls the flow of air to the pads. Similarly a shut off valve 125 and a pressure restricting and directional valve 126 are provided in a line 127. Line 127 connects to either a line 127a or 127b which go to a cylinder on either side of a piston 128. A piston rod connected to piston 128 connects to pad 115 to raise and lower the pad.

As can be readily seen, air pressure on the piston 128 will urge the upper pad 115 down against the part P. Air pressure in the ports of pad 116 will tend to raise the part and P on a cushion of air. Air pressure in the ports of pad 115 will provide an air cushion on the top of the part to dampen vibrations caused during cutting. Tha air cushion thus allows free movement of the part in a planar direction while supporting it against movement in a vertical direction. Obviously to accomplish this a balance is required between the air pressures at the piston 128 and the ports in pads 115 and 116. This balance will depend to a large extent on the weight of the part unsupported by the chuck 26, the cutting force and the size and number of ports. Assuming an unsupported weight of 15 lbs. for a part P-1, and using generally available shop air pressure of 100 psi, a restriction valve 125 for reducing the pressure to 40 psi and a piston size of 1 square inch can be used. Thus the downward force on P-1 is 15 lbs. plus 40 lbs. or 55 lbs. Valve 124 is then adjusted to provide an air pressure greater than 55 lbs. plus the force derived by the cutting blade passing through the material. It is estimated that a pressure of 75 psi or greater (greater air pressure in the lower pad will merely lift the part higher, thus increasing the space between the part and the ports, to reduce the lifting force on the part) is sufficient in the pad 16 for the example given to hold the part off the surface of the pad 116. The air pressure in pad 115 can be shop pressure of 100 psi since its cushioning force is automatically limited by the 40 lbs. applied by piston 128. That is, the height of the pad above the part P will vary depending on the balance between the pressure on piston 128 and the pressure exerted by air from pad 116. As is well known, the air cushion force is also controlled by the position of the pad from the part and thus a balance will continually be sought while fully supporting the part. While this unique air cushion suspension system advantageously enhances the freedom of the cutting action, it should be understood that conventional supports used with band saw machines may also be provided.

COMBINED CUTTING AND PART MOVEMENT

Figure 18:
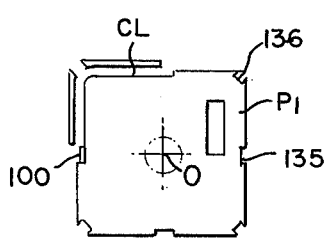
FIG. 18 is a plan view of one typical part that can be made from the apparatus shown in FIG. 1.

The servo motor 112 for changing the angular attitude of the blade 100, the servo motor 72 for changing the angular orientation of the part, and the servo motor 58 for changing the linear position of the part are all simultaneously operated preferably by computerized control such that the part will be cut along a peripheral shape. The ability to change the angular attitude of the blade 100 and provide rotation of the part greatly reduces the amount of linear translation necessary to cut a peripheral contour on the part, especially for full sheets W several feet in length and width, for example, or more commonly smaller parts P of several inches in size, length and width. As is best shown in FIG. 18, the part P-1 is provided with notches 135 made during the punching oepration to allow the waste material to fall free of the part at spaced intervals around the periphery of the part. Additional notches 136 may be provided for relief at sharp corners on the peripheral shape to assure that the blade 100 has ample freedom for its rear surface to negotiate the sharp turns. In general, the blade 100 will have little interference since the conventional band saw blade has its teeth set apart a distance T which allows freedom for the rear of the blade to move a distance $t$ without interfering with the part. The notches 136, of course, eliminate any interference for radically sharp turns. As is readily apparent, movement of the cutting blade into or between the phantom line positions shown in FIG. 24 results in a change in the cutting angle relative to the cutting line CL on the periphery of the part without a substantial change necessary in the position of the part. Thus where the blade 100 follows a cutting line CL on a part P (FIGS. 18 and 28) and approaches a point 1 (FIG. 28) it is readily apparent that as point 1 on the cutting line approaches the cutting blade 100 it will be unnecessary to rotate the part substantially 90°, as in previous practice, in order to change the direction of the cutting line but rather the part can be moved a short distance simultaneously with pivoting of the cutting blade to make the change in cutting direction.

It should be understood that the unique rotary band saw concept of cutting a peripheral shape on a part or worksheet advantageously employs state-of-the-art cutting apparatus. The contouring apparatus, however, can also advantageously be used with rotary routers, slitter, lasers and other well known sheet material cutting tools, some of which may not require the blade orientation feature of the preferred embodiment herein described.

FIGS. 24, 26, 27, 28 and 29 similarily describe a modified contouring apparatus but contain the same basic principles as in the preferred embodiment. In this modified form the cutting blade 100 is held in more simplified rotary guides 140 and 142. The attitude of the guides is controlled by timing belt driven gears 144 powered by a worm 146 and servo motor 148. A part P, as in the preferred embodiment is held in a contouring apparatus 150 having a single upper arm 152. The upper arm 152 is provided with a rotary sleeve 154 that houses a piston 156. The lower end of the piston is connected to a clamp plate 158 centering pins 160. In this embodiment the part P will be provided with centering or pilot holes 162 that will be punched at the punch press 10. In the lower part of the contouring apparatus 150 the arm 152 is rigidly secured to a movable carriage 164. The carriage slides in guides 166 and is powered by a rack and pinion mechanism 168 by a servo motor 170.

The movable carriage 164 is also provided with a rotatably mounted plate 172 which has corresponding openings 174 for receiving the pins 160. The lower plate 172 is rotated by a gear 176 and servo motor 178. Controls 179 and 180 simultaneously control the servo motors 170, 178 and 148 for providing the simultaneous linear and rotational movement of the part P with the angular attitude change of the blade 100.

In this embodiment tough carbide inserts 182 are offset only slightly from the central axis of rotation 108 of the guides to allow the inside cutting edge of the blade to pivot about the axis 108. Also as in the preferred embodiment slots 184 are provided in the upper and lower guides similar to the slots 117 to allow removal and replacement of the blade.

DEBURRING APPARATUS

Figure 10:
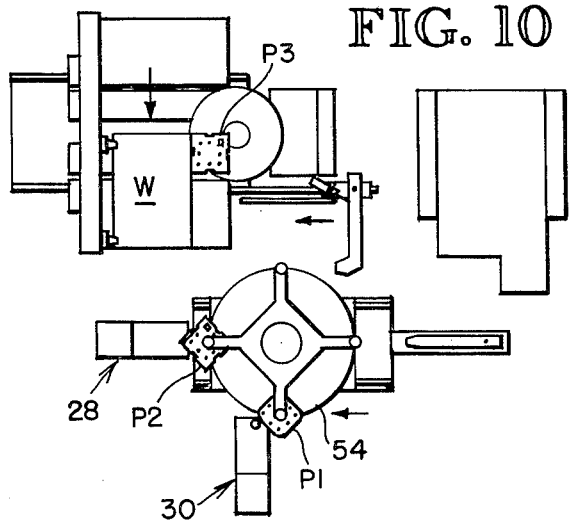
Figure 20:
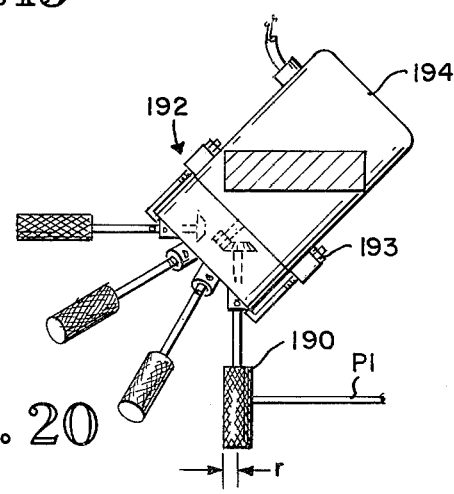
FIG. 20 is a vertical section of a portion of a deburring tool shown in the apparatus in FIG. 1.

The deburring apparatus 30 is best shown in FIGS. 1 and 20 and includes a conventional deburring tool 190 such as a rotary abrasive disk or fine toothed rotary routing type cutter 190. In the preferred embodiment, the router type cutter has fine pitched teeth for finishing versus coarse teeth in conventional cutting routers and is mounted on a turret 192 which allow several similar cutters to be selectively positioned at the deburring station while the other cutters are cleaned. The cutter is rotated by a motor 194 in any suitable manner. As mentioned earlier a continuous band-type deburring tool or file is also usable for point contact deburring. It is the unique feature of this invention that simultaneous peripheral cutting and deburring can take place at the cutting and deburring apparatuses 28 and 30. For this purpose the motor 72 (FIG. 21) is tied to all of the rotary chucks 26 and linear translation of the movable carriage 54 applies equally to all of the chucks. Thus as best shown in FIG. 10, the linear motion of the movable carriage 54 and the rotational motion of the chucks 26 will move two parts along the exact same contour past the blade at the cutting station 28 and at the deburring station 30. In this manner two parts P-1 and P-2 can be simultaneously cut and deburred using a single contouring apparatus.

OVERALL METHOD AND OPERATION OF APPARATUS

Having described all of the separate inventive features of the overall invention as well as the basic overall combinations, it can be seen now that the independent inventive features of the invention also lend themselves to a combined system for complete computer or numerical control for fabricating many parts from large worksheets in a completely automated manner. Reviewing the entire operation, it can be seen that a large worksheet W is placed in the punch press 10 in FIG. 2. At this time it is assumed that the contouring apparatus 22 is empty. In FIG. 3, a part has been punched with its desired internal hole configuration and the turret 12 moved to the special tooling and clamping station. At this time, the piston rods 42 are actuated to hold the part independently of the worksheet positioning means 14. Next the final punch 36 removes the last connecting piece of material 37 freeing the part P-1 from the worksheet W. In FIG. 4 the side table 16 is moved to the right from the home position a sufficient distance to allow the gauge 42 to abut against the gauge block 18 and locate the clamp 52 of the transfer mechanism centrally in alignment with the reference point 0 in the part P-1. In FIG. 5, the part P-1 is rotated away from the punch press. At this point, the part has been completely removed from the punch press ready to be placed in a contouring apparatus.

Figure 8:
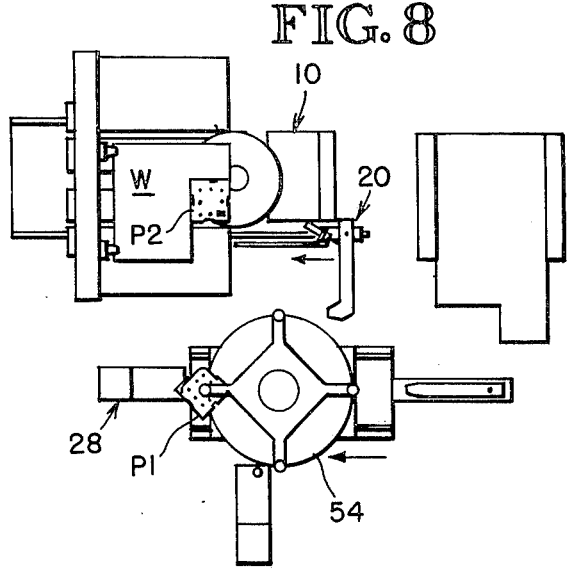

In FIG. 6 the arm 45 remains in its home position, to the right in FIG. 6, while the movable carriage 54 is positioned so that the central axis of the rotary chuck 26 is directly aligned with the reference point 0 on the part P-1. In FIG. 7 the turret 24 now holds the part. As shown in phantom lines, it can be seen that the part P-1 is simultaneously rotated as it is moved from the receiving position to the cutting station and retains its same angular orientation between the stations. In FIG. 8, the movable carriage 54 is moved toward the cutting apparatus 28 and the part P-1 rotated with the afore described simultaneous motions of the part and blade attitude to begin to cut a peripheral shape on the part P-1. Meanwhile at the punch press 10 a second part P-2 has been punched and is approaching the part separation operation. It is of course understood that the part P-2 will remain either in the punching apparatus or in the transfer mechanism 20 until such time as the part P-1 has been completely cut at the cutting apparatus 28. The cutting speed with a conventional band saw blade 100 is adequate to provide somewhat similar time requirements for cutting as is required for punching in the punch press so little delay will result by combining the punch press and contouring apparatus.

Figure 9:
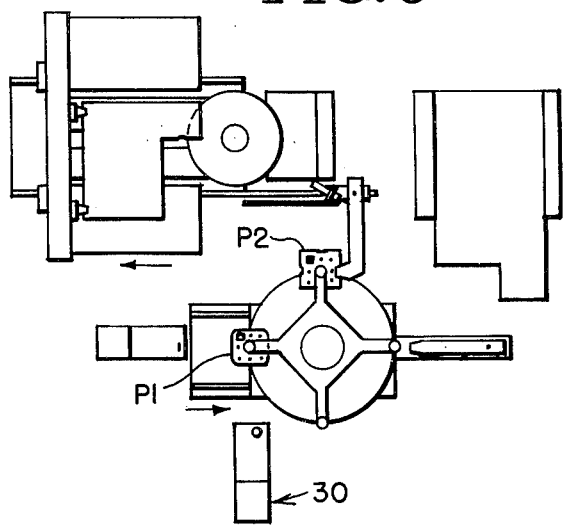
Figure 11:
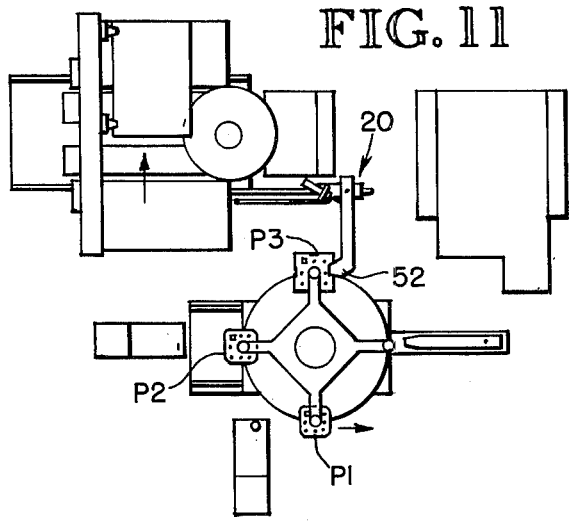
Figure 12:
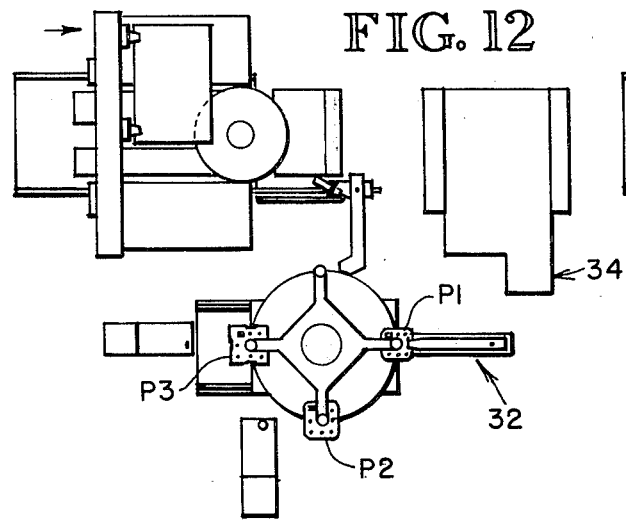

In FIG. 9 a part P-2 has now been delivered into the contouring apparatus and the part P-1 is ready to be moved to the deburring station 30. In FIG. 10 the part P-1 is being deburred while simultaneously the part P-2 is being cut and while still simultaneously a part P-3 is being punched in the punch press 10. FIG. 11 illustrates all three parts now in the contouring apparatus at various stations of completion. In FIG. 12 part P-1 is being removed by a transfer mechanism 32 for delivery to the folding apparatus 34.

The transfer apparatus 32 is basically identical to the transfer mechanism 20 so that accurate positioning of the parts delivered from the contouring apparatus to the folding machine or other suitable fabricating apparatus is easily accomplished. The transfer mechanism 32 is mounted on an independent slide 200 so that it can be positioned along the width of the folding machine 34 if desired.

Figure 13:
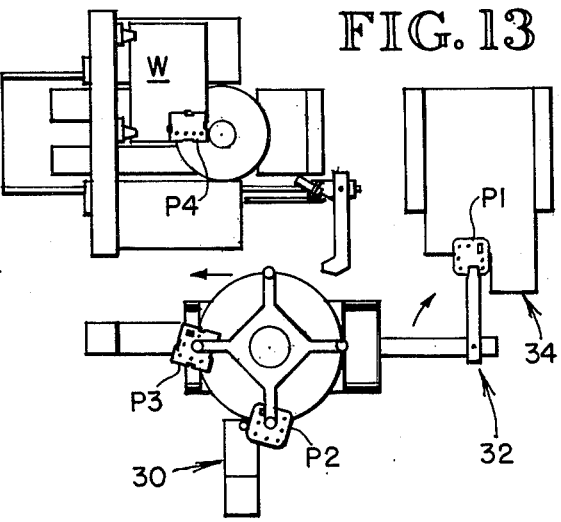
Figure 14:
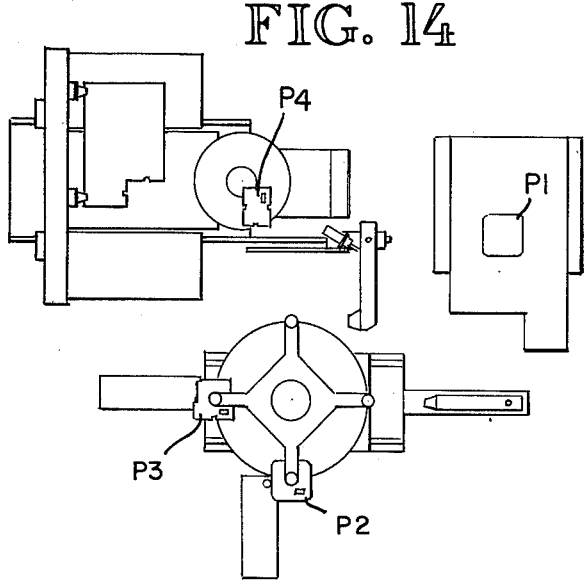

In FIG. 13 the part P-1 has now been delivered to the folding machine 34 while the part P-2 is being deburred and the part P-3 is being cut. Also in FIG. 13 a new part P-4 is being punched. As is apparent, the part P-4 has a different peripheral shape than parts P-1 - P-3 indicating that the contouring apparatus is capable of handling various shaped parts. One station of the turret 24, will of course, have to be left empty since in the preferred embodiment only parts of identical contour can be simultaneously cut and deburred.

The method of this invention relates to the overall punching, transferring and contouring invention. The steps comprise punching a part with an arrangement of internal openings, if necessary, separating all but one end of the part from a larger worksheet, clamping the part separate from the worksheet, separating said one end from the worksheet, automatically engaging the part at a known location and orientation and transferring the part to a subsequent station, and automatically receiving the part at said subsequent station in an exact location and orientation. In the preferred embodiment, the subsequent station is a part handling apparatus for bringing the part through peripheral contour cutting and deburring stations but the part separation and transfer should be recognized as an independent inventive feature also.

Another inventive method feature is the simultaneous movement of two or more parts through identical paths past cutting and deburring tools and the automatic advancing of the part sequencially first past the cutting tool and thence past the deburring tool whereby multiple parts are cut and deburred.

Known techniques for providing a manual input into a computerized control are provided for operating this invention. Similarily various automated computer inputs may be adapted for automatically providing the input and will be readily apparent to one skilled in the art. Computerized controls for the output of the machine are already used in some forms of cloth cutting such as described in U.S. Pat. Nos. 3,610,081 or 3,511,124. Such controls are adaptable by one skilled in the art for use in the computerized control of this invention. If desired, it is also well within the skill of the art to provide a manually controlled consul from which all of the operations can be remotely but manually controlled by one or more operators.

While the preferred embodiments of the invention and various inventive features of the invention have been illustrated and described, it should be understood that modifications and variations to each of them will be apparent to one skilled in the art without departing from the principles herein. It should also be repeated that several of the features are completely independent in ventions useful separately, as described, in addition to their use in the punching and contouring combination. The inventions thus provide a unique technique for separating individual parts from larger worksheets by the use of a turret type punch press. Secondly, a uniqu transfer mechanism slaved to the position of the workpiece positioning means of a punch press is provided. Thirdly, a rotary chuck, which in effect amounts to a vertical sheet material lathe, is provided for simultaneously rotating and linearly translating a piece of self form-sustaining sheet material such as wood, plastic or metal. Fourthly, the rotary lathe in combination with a cutting device having attitude control, such as a slitting blade or a band saw blade, is provided for cutting peripheral shapes in the sheet material without requiring large linear translations of the sheet material. Fifthly, an air cushion edge support is provided to support and dampen ascillations of the edge of a part while being cut. Finally, apparatus and methods directed to an entire overall part fabricating combination is provided regardless of the type of cutting tool or deburring tool or punching tool employed. This overall combination allows the simultaneous punching and contouring of a large variety of relatively few numbers of sheet material parts.

The embodiment of the invention in which an enclusive property or privilege is claimed are defined as follows:

1. Apparatus for separating parts from larger worksheets in a punch press and transferring the parts to a subsequent apparatus comprising a punch press, means on the punch press for positioning a large worksheet in both the X and Y axes beneath a punching station, means for punching the part free of said worksheet, and means for transferring the cut part to said subsequent apparatus, said means for punching the part including a rotary turret, a plurality of tools on said turret positionable at said punching station, means on said turret for holding a part separate from the worksheet, and means for rotating said turret to a part discharge station while holding the part.

2. The apparatus of claim 1 said turret having upper and lower sections, said part holding means including a clamp on said turret having a plurality of automatically actuated rams on one section for squeezing the part against the opposite section.

3. The apparatus of claim 2 said tools including an edge punch for separating a remaining uncut peripheral edge of a part from the worksheet, said clamp and edge punch being operated in timed sequence so that a part is clamped in the turret and then finally severed from the worksheet by said edge punch, said part discharge station being approximately 90° from said punching station.

4. The apparatus of claim 3 said transfer means including support means, an arm pivotably mounted on said support means, means for swinging said arm exactly a predetermined number of degrees to said subsequent apparatus, part gripping means on the free end of said arm, means for reciprocating said support means in the Y axis toward and away from said discharge station, and gauging means for positioning the support means in the Y axis so that the gripping means engages the part at a predetermined location along the Y axis.

5. The apparatus of claim 4 said adjacent machine having rotary chuck means, means for positioning the rotary chuck means at a predetermined location relative to said part gripping means on said arm whereby the placement of the part in said rotary chuck means is exactly determined by the number of degrees of the arc of said pivoted arm, the rotary chuck positioning means, and said gauging means.

6. Apparatus for separating parts from larger worksheets in a punch press having a punching station and a part discharge station and transferring the parts separated from the worksheet to a subsequent apparatus comprising a punch press, means on the punch press for positioning a large worksheet in both the X and Y axes beneath the punching station, means for punching the part free of said worksheet, means on the punch press for moving the cut part separate from said worksheet in said worksheet-positioning means to said discharge station, and means for transferring the cut part to said subsequent apparatus, said part discharge station being approximately 90° from said punching station.

7. Apparatus for separating parts from larger worksheets in a punch press and transferring the parts to a subsequent apparatus comprising a punch press, means on the punch press for positioning a large worksheet in both the X and Y axes beneath a punching station, means for punching the part free of said worksheet, and means for transferring the cut part to said subsequent apparatus, said subsequent machine having rotary chuck means, said part having a defined reference point, said transfer means including a swingable arm, means for positioning the arm in the X and Y axes for engaging the part at an exact desired location on the part relative to said reference point, and means for positioning the rotary chuck means and the arm for receiving the transferred part in an exact location and orientation relative to said reference point whereby the location and orientation of the part in the chuck means can be programmed and used for automatically positioning the part during subsequent operations in said subsequent machine.

* * * * *